US012766600B2

(12) United States Patent
Delacroix et al.

(10) Patent No.: US 12,766,600 B2
(45) Date of Patent: Oct. 20, 2026

(54) CHARACTERISATION OF A BED OF METAL POWDER BY COLORIMETRY

(71) Applicant: COMMISSARIAT A L'ENERGIE ATOMIQUE ET AUX ENERGIES ALTERNATIVES, Paris (FR)

(72) Inventors: Timothée Delacroix, Villepreux (FR); Jean-Paul Garandet, Saint Cloud (FR); Hicham Maskrot, Monthlery (FR); Frédéric Schuster, St Germain en Laye (FR); Fernando Lomello, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 720 days.

(21) Appl. No.: 18/196,553

(22) Filed: May 12, 2023

(65) Prior Publication Data

US 2023/0364683 A1 Nov. 16, 2023

(30) Foreign Application Priority Data

May 12, 2022 (FR) ...................................... 2204524

(51) Int. Cl.
*B22F 12/90* (2021.01)
*B22F 10/28* (2021.01)
(Continued)

(52) U.S. Cl.
CPC .............. *B22F 12/90* (2021.01); *B22F 10/28* (2021.01); *B22F 10/31* (2021.01); *B22F 10/34* (2021.01);
(Continued)

(58) Field of Classification Search
CPC .......... B22F 12/90; B22F 10/28; B22F 10/31; B22F 10/34; B22F 10/37; B33Y 10/00; B33Y 30/00; B33Y 40/00; B33Y 50/02; B33Y 70/00; G06T 2207/30136; G06T 7/90; G06T 7/0004; Y02P 10/25;
(Continued)

(56) References Cited

U.S. PATENT DOCUMENTS

| | | | |
|---|---|---|---|
| 10,981,225 | B2 | 4/2021 | Schade |
| 2020/0327267 | A1 | 10/2020 | Collins et al. |

(Continued)

OTHER PUBLICATIONS

Delacroix, et al., "Influence of powder recycling on 316L stainless steel feedstocks and printed parts in laser powder bed fusion", Addit. Manuf., vol. 50, p. 102553, 2022.

(Continued)

*Primary Examiner* — Christopher Wait
(74) *Attorney, Agent, or Firm* — BakerHostetler

(57) ABSTRACT

A method for determining an oxygen concentration of a powder of a metallic material taking the form of a powder bed, the method includes steps consisting in: A) producing an image of at least a part of the powder bed, the image comprising a set of pixels, a pixel having a colour coded in accordance with a colorimetric code comprising three quantities, B) determining the oxygen concentration of the powder from values of the three quantities associated with pixels of the image using a predefined calibration function, a function of the material, and linking the oxygen concentration and the three quantities.

17 Claims, 12 Drawing Sheets

(51) Int. Cl.

| | |
|---|---|
| ***B22F 10/31*** | (2021.01) |
| ***B22F 10/34*** | (2021.01) |
| ***B22F 10/37*** | (2021.01) |
| ***B33Y 10/00*** | (2015.01) |
| ***B33Y 30/00*** | (2015.01) |
| ***B33Y 40/00*** | (2020.01) |
| ***B33Y 50/02*** | (2015.01) |
| ***B33Y 70/00*** | (2020.01) |

(52) U.S. Cl.
CPC .............. *B22F 10/37* (2021.01); *B33Y 10/00* (2014.12); *B33Y 30/00* (2014.12); *B33Y 40/00* (2014.12); *B33Y 50/02* (2014.12); *B33Y 70/00* (2014.12)

(58) Field of Classification Search
CPC ............... G01N 21/251; G01N 21/274; G01N 2021/1776; G01N 2201/127
See application file for complete search history.

(56) References Cited

U.S. PATENT DOCUMENTS

| | | | | |
|---|---|---|---|---|
| 2021/0178468 | A1 | 6/2021 | Larouche et al. | |
| 2021/0331399 | A1* | 10/2021 | Seita ........................ | B22F 10/28 |

OTHER PUBLICATIONS

Li, et al., "In Situ 3D Monitoring of Geometric Signatures in the Powder-Bed-Fusion Additive Manufacturing Process via Vision Sensing Methods", Sensors, vol. 18, Issue 4, p. 1180, 2018.

* cited by examiner

CHARACTERISATION OF A BED OF METAL POWDER BY COLORIMETRY

CROSS-REFERENCE TO RELATED APPLICATION

This application claims priority to foreign French patent application No. FR 2204524, filed on May 12, 2022, the disclosure of which is incorporated by reference in its entirety.

FIELD OF THE INVENTION

The present invention concerns the field of the characterisation of metal powder, more particularly of the determination of the oxygen concentration of the powder, the latter having a plane surface (bed of powder). This characterisation is typically of benefit when executing a method of metallic additive manufacturing of a part.

BACKGROUND

A metal powder is liable to oxidise during use, which can interfere with its use. This problem arises for example when executing a metallic additive manufacturing powder bed fusion (MAM-PBF) method by selective consolidation of a powder bed. The fields in which this method is used are typically aeronautics, aerospace, biomedical, automotive and nuclear.

Metallic additive manufacturing consists in producing parts by successive addition of (metallic) material layer by layer on the basis of a 3D digital file. By powder bed PB is to be understood a controlled thickness of powder MP having a plane surface. The metallic material Mat constituting the powder is for example chosen from: stainless steels, titanium-based alloys, aluminium-based alloys, nickel-based alloy.

Manufacturing entails spreading thin layers of powder (typically between 10 and 100 μm thick) one above the other, with a step of selective consolidation of the material between each layer deposition. The selective consolidation is carried out for example using one or more laser beams, using an electron beam, by laser sintering or by binder spraying. By consolidation is to be understood rendering the material rigid by binding the particles of powder together.

An example of a system 15 employing MAM-PBF manufacturing of a part Pa using a laser beam LB (denoted L-PBF) is depicted in FIG. 1. It comprises a tank PC of metallic powder MP, a manufacturing platform MPL and a powder collection tank PCT. A powder spreading device PSD pushes the powder from the tank to the platform MPL in a spreading direction SD in such a manner as to deposit a controlled thickness of powder (typically of the order of 10 to 100 μm) known as the powder bed PB. The direction SD is along the axis X and the plane of the powder bed is the plane XY, Z being the vertical direction. During spreading excess powder is tipped into the collection tank PCT. The spreading device PSD is for example a scraper, a roller or a brush. Positioned in the tank Tk used for manufacturing is a vertical movement device MD for moving the manufacturing substrate Sub that causes the substrate and the part Pa being formed to descend along Z as the layers are deposited and consolidated. At the commencement of manufacturing the substrate Sub receives the powder bed and then during manufacturing the part is attached to this substrate. Here the consolidation device CD comprises a laser L and a set of mirrors LSD controlled by the processing unit UT0 that deflects the laser beam LB as a function of the data from the 3D file.

Thus the MAM-PBF method comprises for each layer a cycle comprising a step of spreading powder including evacuation of excess powder (and the return of the device PSD to its initial position) and a consolidation step. The substrate is then lowered and a new cycle produces the next layer, and so on up to the final layer.

Once manufacturing has finished the substrate to which the manufactured part or parts is or are fixed is removed from the machine. The powder filling the tank Tk and that from the tank PCT is recovered and possibly screened, characterised and where appropriate mixed with new powder to be reused in future manufacturing. In fact only a very small portion of the powder is consolidated as a part during manufacturing and the non-melted powder can be recovered and reused for future manufacturing. However, some particles are degraded because of the interactions between the laser and the material, the high temperatures encountered and the imperfectly controlled atmosphere in the manufacturing chamber. Reusing the powder therefore gives rise to deterioration of the attributes of some particles that are randomly distributed in the powder. The deterioration of the quality of the powders induces a reduction of the properties of the parts produced. An increase in the oxygen concentration of the recycled powder has been noted in the literature for many materials. Some particles of powder are surrounded by a more or less homogeneous layer of oxide the chemical nature of which depends on the material Mat. For example, the publication by T. Delacroix et al. "Influence of powder recycling on 316L stainless steel feedstocks and printed parts in laser powder bed fusion" (Addit. Mauf., vol. 25, pp. 84-103, 2019) describes this phenomenon for stainless steel powders. A good indicator of the deterioration of the quality of the powder, typically when it is used for MAM-PBF manufacturing, is therefore its oxidation.

At present samples of powder are collected between manufacturing cycles and characterised ex situ in small quantities in order to evaluate the quality thereof. These small quantities of characterised material are not necessarily representative of all of the powder.

In some cases, so as not to take any risks, the non-melted powder recovered after manufacturing is not checked but instead directly rejected in order to use only new powder and to assure the quality of the parts manufactured, which leads to an increase in the cost of the part.

SUMMARY OF THE INVENTION

An object of the present invention is to remedy the aforementioned disadvantages by proposing a method of determining the oxygen concentration of a powder of a metallic material taking the form of a powder bed and an associated device that is fast, of relatively low cost and can be implemented directly, on line, during execution of a metallic additive manufacturing powder bed method.

The present invention has for subject a method for determining an oxygen concentration of a powder of a metallic material taking the form of a powder bed, the method comprising steps consisting in:

A) Producing an image of at least a part of said powder bed, said image comprising a set of pixels, a pixel having a colour coded in accordance with a colorimetric code comprising three quantities, B) Determining the oxygen concentration of the powder from values of said three quantities associated with pixels of the image using a predefined calibration function, that is a function of said material, and linking said oxygen concentration and said three quantities.

In accordance with one embodiment, the colorimetric code is the RGB system, the three quantities being known as R, G and B.

In accordance with one embodiment, the calibration function is a first-degree or second-degree polynomial with three variables corresponding to the three quantities and the coefficients of which are a function of the material.

According to a variant, step A is carried out all at once using a video camera.

According to another variant, step A is carried out by scanning using a flat-bed scanner.

In accordance with a first method, step B comprises substeps consisting in:

B1) Determining for a plurality of pixels of the image an oxygen concentration, known as the pixel concentration, via the calibration function, B2) Determining the oxygen concentration from a mean value of said pixel concentrations.

In accordance with a second method, step B comprises substeps consisting in:

B'1) Determining a mean value of each quantity from values of said quantities associated with a plurality of pixels of the image, B'2) Determining the oxygen concentration from said mean values of the three quantities via the calibration function.

In another aspect, the invention concerns a method for metallic additive manufacturing by selective consolidation of a powder bed including a step according to the invention of determining the oxygen concentration of said powder bed carried out at least once in said metallic additive manufacturing method.

In accordance with one embodiment of the metallic additive manufacturing method in accordance with the invention, the method of determining the oxygen concentration of the powder bed is applied at the commencement of the metallic additive manufacturing method, during injection of inert gas into a manufacturing chamber, and/or at the end of the metallic additive manufacturing method, during cooling of a manufactured part.

In accordance with one embodiment, the metallic additive manufacturing method according to the invention comprises a step of adapting parameters of the method as a function of the value of the oxygen concentration that has been determined.

In accordance with one embodiment, the metallic additive manufacturing method according to the invention further comprises a step of mixing the powder used with new powder when the oxygen concentration is greater than a predetermined threshold, the mixing step being carried out between two manufacturing operations for parts.

In another aspect, the invention concerns a device for determining an oxygen concentration of a powder of a metallic material taking the form of a powder bed, comprising:

an image capture device configured to produce an image of at least a part of said powder bed, said image comprising a set of pixels, a pixel having a colour coded in accordance with a colorimetric code comprising three quantities, a first processing unit configured to determine the oxygen concentration of the powder from values of said three quantities associated with pixels of the image using a predefined calibration function, that is a function of said material, and linking said oxygen concentration and said three quantities.

In another aspect, the invention concerns a computer program including instructions that cause the device according to the invention to execute the steps of the method according to the invention of determining the oxygen concentration.

In yet another aspect, the invention concerns a system for metallic additive manufacturing by selective consolidation of a powder bed, comprising:

a device according to the invention for determining the oxygen concentration, a tank intended to receive a substrate on which a part will be manufactured, a device for spreading said powder on the surface of the powder bed, a device for consolidating the powder, a second processing unit configured to control the execution of the metallic additive manufacturing.

In accordance with one embodiment, the image capture device comprises a flat-bed scanner connected to the spreading device.

In accordance with one embodiment, the image capture device comprises a high-resolution video camera.

In yet a further aspect, the invention concerns a method of determining a calibration function for the execution of the method according to the invention of determining an oxygen concentration comprising steps consisting in:

obtaining a plurality of samples of said powder, each sample having a different and known oxygen concentration, producing an image of each sample and determining an associated mean colour, a colour being coded in accordance with a colorimetric code comprising three quantities, colours with an associated oxygen concentration value being known as calibration data, determining said calibration function from said calibration data by regression.

The following description describes a number of exemplary embodiments of the device of the invention: these examples are not limiting on the scope of the invention. These exemplary embodiments have both the essential features of the invention and additional features linked to the embodiments concerned.

BRIEF DESCRIPTION OF THE DRAWINGS

The invention will be better understood and other features, aims and advantages thereof will become apparent in the following detailed description with reference to the appended drawings provided by way of non-limiting examples and in which.

DETAILED DESCRIPTION

Figure 1:
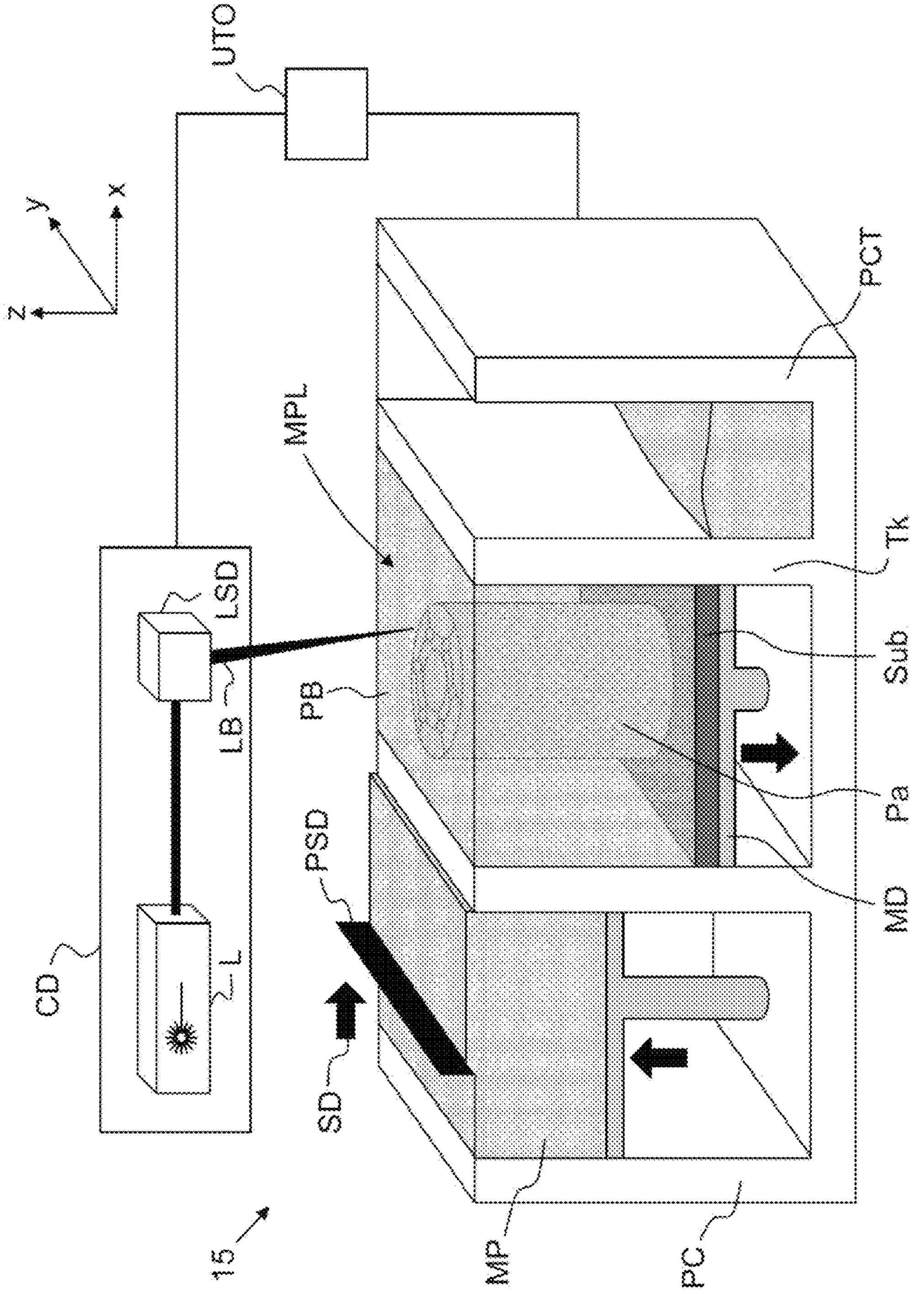
FIG. 1, already cited, depicts a system employing metallic additive manufacturing by selective consolidation of a powder bed.
Figure 2:
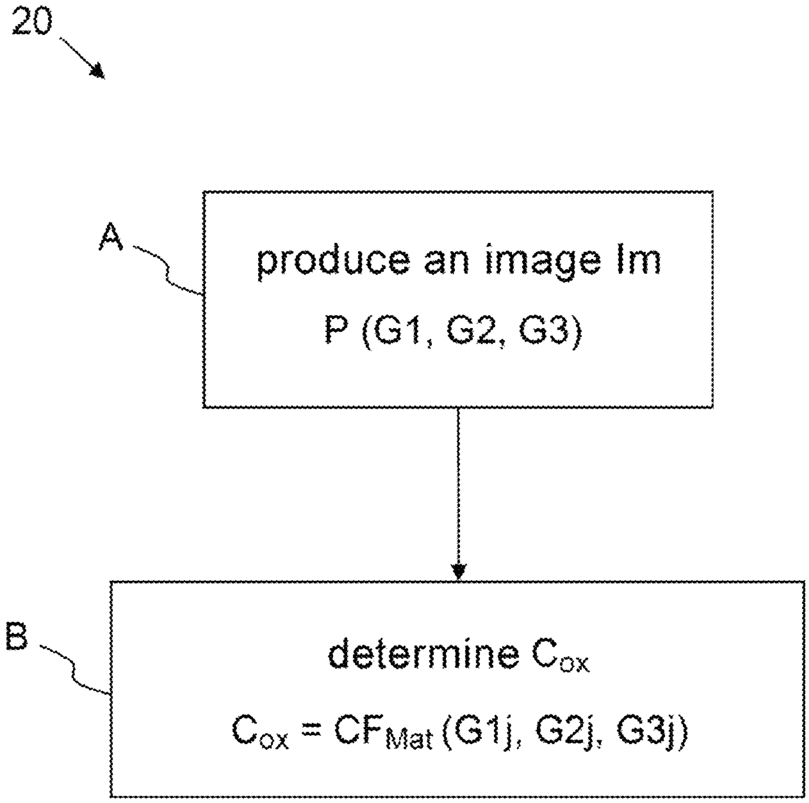
FIG. 2 depicts the method according to the invention of determining an oxygen concentration of a powder taking the form of a powder bed.

The method 20 according to the invention of determining an oxygen concentration Cox of a powder MP of a metallic material Mat taking the form of a powder bed PB is depicted in FIG. 2. It is based on colorimetry and uses the colour of the particles to determine the oxygen concentration of the powder which, as described above, is a good indicator of the deterioration of the quality of the powder in metallic additive manufacturing.

The concentration by weight of oxygen Cox of a particle represents the quantity of oxygen entering into the composition of the particle and present mainly at its surface. It is typically measured in weight parts per million (wppm).

During oxidation of metallic powders at high temperature, a surface layer of oxide forms. Different layer thicknesses result from different heating conditions and give rise to different oxygen concentrations. Colours are observable and produced by virtue of these different oxide film thicknesses and interference between light reflected by the film/metal interface and light reflected by the upper part of the oxide (film/air interface). It is therefore possible to correlate the colour of a particle and its oxygen concentration.

The method according to the invention carries out the analysis directly on the powder bed PB, that is to say on a layer of powder having a plane surface.

It comprises a first step A consisting in producing an image Im of at least a part of the powder bed PB. The image comprises a set of pixels Pi where i is the index of the pixel and during imaging a pixel of the image has a colour Coli coded in accordance with a colorimetric code comprising three quantities G1, G2, G3. Because of the visual trivariance three numbers suffice for the identification of a colour.

In accordance with one embodiment, the colorimetric code is the RGB (or RGB additive synthesis) system and G1=R, G2=G and G3=B. Light is added to reproduce the different colours. By the additive synthesis of three light beams of colours red R, green G and blue B, it is possible to create/characterise most colours. To display/characterise a specific colour, the proportion of each of the three additive primary colours RGB in its composition is determined. The absolute addition of these three colours yields white. This model is in very widespread use because it corresponds to the way colour monitors work. Each primary colour oscillates as a percentage between 0% and 100% or as a value between 0 and 255 (coding on 8 bits, 24 bits in total per colour): a particular colour is therefore specified by indicating the contributions of each primary colour. Having 256 shades of each primary colour enables 16.7 million (256×256×256) colours to be created. This coding is also used when producing an image in colour of a scene using a detector provided with coloured filters. With RGB coding a pixel Pi is associated with a triplet (Ri, Gi, Bi).

However, any type of colour coding is usable for the invention, for example (cyan, magenta, yellow) coding, CIE XYZ coding derived from RGB coding or CIE U'V'W, CIE L*a*b* coding.

To execute the method, in one embodiment the initial coding of the imaging device is used; in another embodiment a transformation to some other form of coding is effected (typically a change of the system of axes). What is important is to have available information on the colour of the pixels of the image of the powder bed PB, that information being coded by a triplet of values.

In a second step B the oxygen concentration of the powder is determined from values of the three quantities associated with pixels of the image using a predefined calibration function $CF_{Mat}$, that is a function of the material Mat, and linking the oxygen concentration Cox and the three quantities:

$$Cox=CF_{Mat}(G1,G2,G3)$$

Let Pj denote the pixels of the image that are used in the method according to the invention. The pixels Pj may correspond to all of the pixels of the image or to some of the pixels thereof.

Thus the oxygen concentration Cox of the powder MP taking the form of a powder bed PB and imaged is determined from a triplet set (G1j, G2j, G3j) associated with the pixels Pj.

After numerous experiments and considerable research the inventors have identified calibration functions $CF_{Mat}$ linking a given colour to a unique oxygen concentration in the range of interest (bijective relation between colour and oxygen concentration). This range of interest is typically an oxygen concentration by weight, measured in wppm, in the range [200, 2500]. Moreover, it has been demonstrated that measurement of colour by commercially available imaging devices is compatible with precise determination of the oxygen concentration. Note that a given material Mat may correspond to a plurality of calibration functions.

Very good oxygen concentration measurement results have been obtained. This is a remarkable and surprising result. The mechanisms of deterioration of the laser melted powder on the powder bed are in fact highly complex because of the laser-material interaction and physical phenomena occurring in the melt pool, with convection flows and ejecta of liquid material, and the entrainment of particles close to the laser by backpressure. There are found in the recycled powder coloured particles but also particles having surface oxide nodules with no continuous oxide films generating colours (see for example the aforementioned publication by Delacroix et al.). It was therefore not evident a priori that oxygen determination by colorimetry to monitor the quality of the powders being additively manufactured is predictable and comparable to conventional measurements (see below).

The method 20 according to the invention utilises the fact that it is possible to take an image of the powder bed because the latter has a plane structure. It has the advantage of producing contactless characterisation in situ of the oxygen concentration by acquiring an image of the powder bed and determining the oxygen concentration of the powder layer thanks to the colorimetry of the image. It does not necessitate manipulation of the powder, does not apply to samples but directly to the powder bed, and can therefore be easily integrated into a process utilising a powder bed (see below).

Moreover, its execution necessitates few means, the calibration function being determined in an independent manner and stored in memory. The inventors have also demonstrated that the calibration function can be expressed as a first-degree or second-degree polynomial with three variables corresponding to the three quantities and the coefficients of which are a function of the material Mat (see below an example of determining this calibration function).

In a first variant, step A (production of the image of the powder bed) is a one step process using a video camera and in a second variant described in detail below step A is carried out by scanning using a flat-bed scanner.

In a manner that is not limiting on the invention, in the remainder of the description the three quantities RGB will be used for coding the colour.

Figure 3:
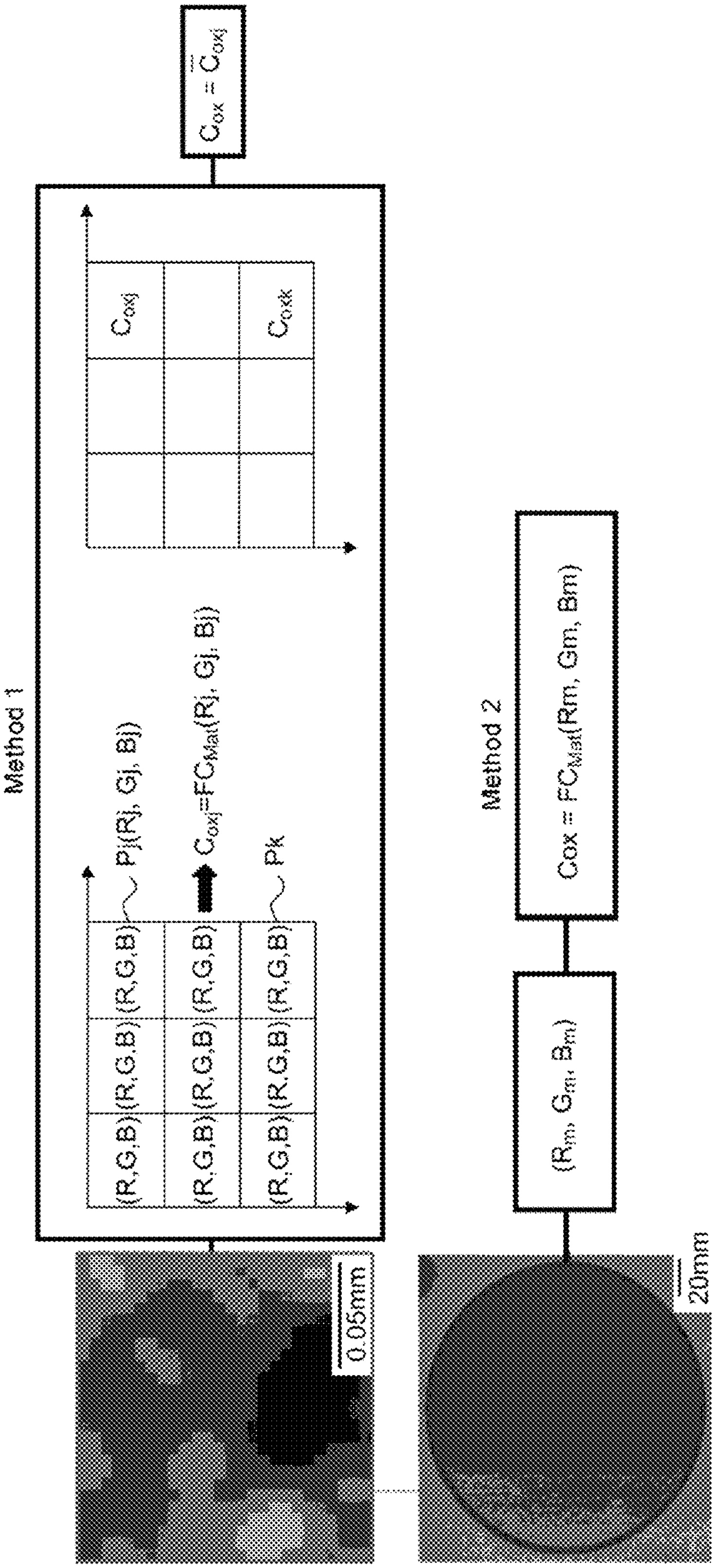
FIG. 3 depicts two applicable methods for executing step B of the method according to the invention.

Step B of the method according to the invention may be executed using two methods depicted in FIG. 3.

Figure 4:
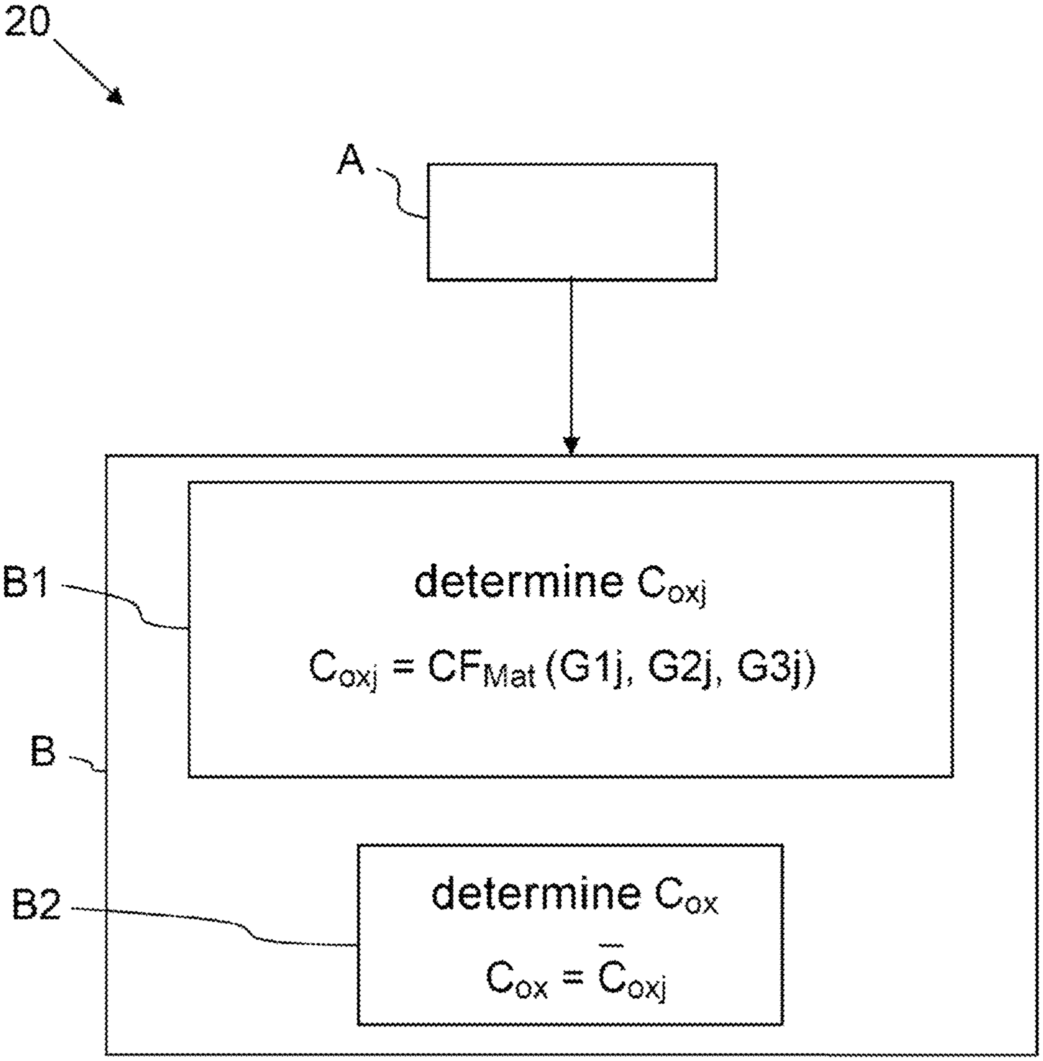
FIG. 4 depicts the first method for executing step B according to the invention.

In a first method also described in FIG. 4 the calibration function is applied to obtain the oxygen concentration for each pixel after which the mean oxygen concentration of the bed is calculated by summation over all the individual pixels Pj. Thus there is determined first in a step B1 and for a plurality of pixels Pj the corresponding oxygen concentration Coxj, known as the pixel concentration, via the calibration function:

$$Coxj=\mathrm{FC}_{Mat}(Rj,Gj,Bj)$$

Then in a step B2 the oxygen concentration is determined on the basis of a mean value of the pixel concentrations Coxj:

$$Cox=\overline{Coxj}$$

Figure 5:
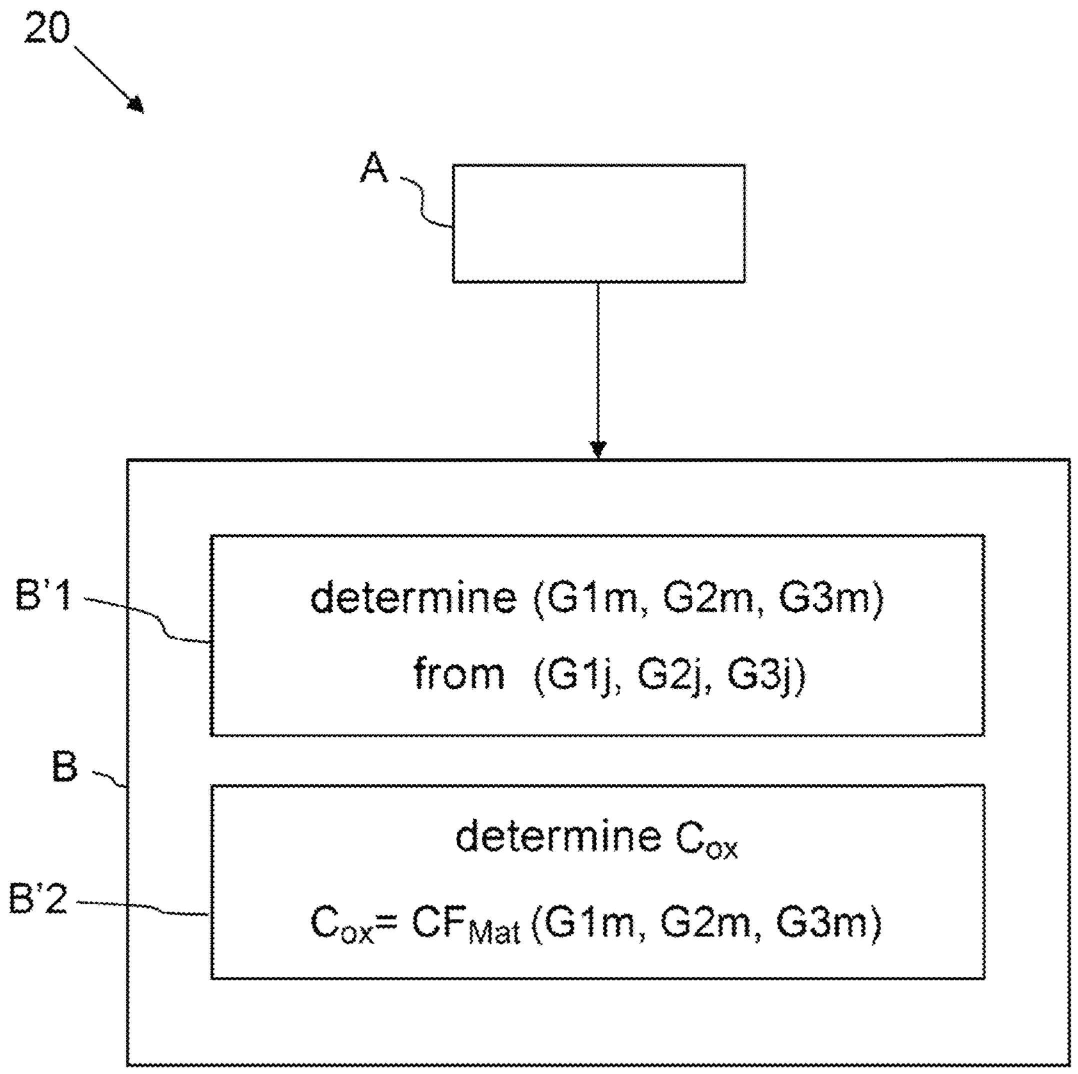
FIG. 5 depicts the second method for executing step B according to the invention.

In a second method also described in FIG. 5 there is first determined in a step B'1 a mean value (Rm, Gm, Bm) of each quantity from values (G1j, G2j, G3j) of the quantities associated with a plurality of pixels of the image Pj.

Then in a step B'2 the oxygen concentration is determined from mean values of the three quantities via the calibration function:

$$Cox=\mathrm{FC}_{Mat}(Rm,Gm,Bm).$$

The first method should theoretically be more robust because it applies the calibration function to each pixel and the mean value of these concentrations Coxj may therefore be assumed to represent the physical value of the quantity of oxygen present in the powder bed. The second method is faster because the image processing for determining the mean quantities Rm, Gm, Bm over a set of pixels Pj is very simple and the calibration function is applied only once.

Given the diversity of the coloured particles present on the powder beds of degraded raw materials, it was not evident a priori that the two methods give similar results. Moreover, from a mathematical point of view significant differences could have been expected when the correlation function adopted is not linear. However, the inventors have compared the results obtained with the two methods and, surprisingly, the second method yielded results as good as the first method (see example below).

The fact that the method according to the invention is carried out in situ on a powder bed enables it to be inserted easily into a MAM-PBF method of which one example is described in the prior art. In another aspect the invention concerns a method of metallic additive manufacturing by selective consolidation of a powder bed including a step of determining the oxygen concentration of the powder bed using the method 20 according to the invention. The method 20 is carried out at least once in the MAM-PBF method.

In accordance with one embodiment the method 20 is applied at the commencement of the metallic additive manufacturing method during injection of inert gas into a manufacturing chamber and/or at the end of the metallic additive manufacturing method, during cooling of a manufactured part.

In accordance with one embodiment step A of the method 20 is effected by scanning simultaneously with a step of spreading the powder (see below).

Thanks to the method 20 according to the invention a new opportunity is available for checking the quality of the powders directly on line, in the machine, on totally representative samples used directly for manufacturing.

Having the oxygen concentration measurement available in situ in the MAM-PBF method enables adjustments that until now have been impossible. In one embodiment the MAM-PBF method comprises a step of adaptation of the parameters of the method as a function of the value of the oxygen concentration that has been determined. This means for example modifying the power of the laser, the scanning speed of the laser or the distance between two laser trajectories, all of which influence the local energy density applied to the material, more energy having to be applied to a powder surrounded by a layer of oxide to eliminate it by melting or vaporisation.

Moreover, it is at present possible to avoid using powders of poor quality, that is to say that have too high an oxygen concentration. In one embodiment the metallic additive manufacturing method comprises a step of mixing the used powder with new powder when the oxygen concentration of the used powder is above a predetermined threshold CO. The mixing step is carried out between two manufacturing operations for parts.

In accordance with another aspect the invention concerns a device 10 for determining the oxygen concentration Cox of a powder MP of a metallic material Mat taking the form of a powder bed PB. The device 10 comprises an image capture device ICD configured to produce an image Im of at least a part of the powder bed, the image Im comprising a set of pixels Pi, a pixel of the image having a colour coded in accordance with a colorimetric code comprising three quantities (G1, G2, G3). The device 10 also comprises a first processing unit UT1 configured to determine the oxygen concentration of the powder from values of the three quantities associated with pixels of the image using a predefined calibration function $CF_{Mat}$, that is a function of the material Mat, and linking the oxygen concentration Cox and the three quantities.

Figure 6:
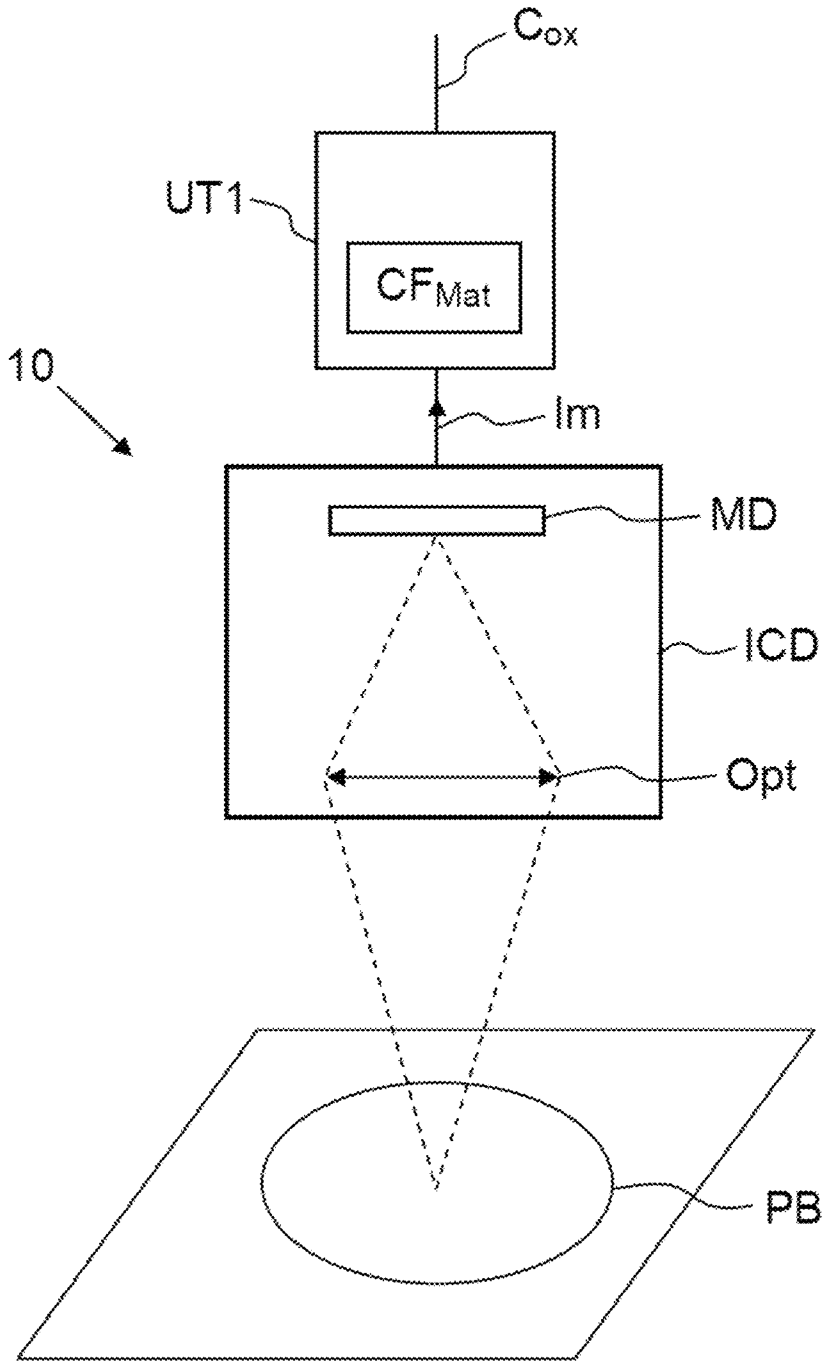
FIG. 6 depicts a first variant of a device according to the invention in which the image capture device comprises an optic and a matrix detector.

A first variant of the device 10 according to the invention is depicted in FIG. 6 in which the device ICD comprises an optic Opt and a matrix detector MD. The image is captured all at once. The image capture device preferably comprises a high-resolution video camera.

In a second variant of the device 10 according to the invention the device ICD comprises a flat-bed scanner capturing an image of the powder bed by scanning.

Figure 7:
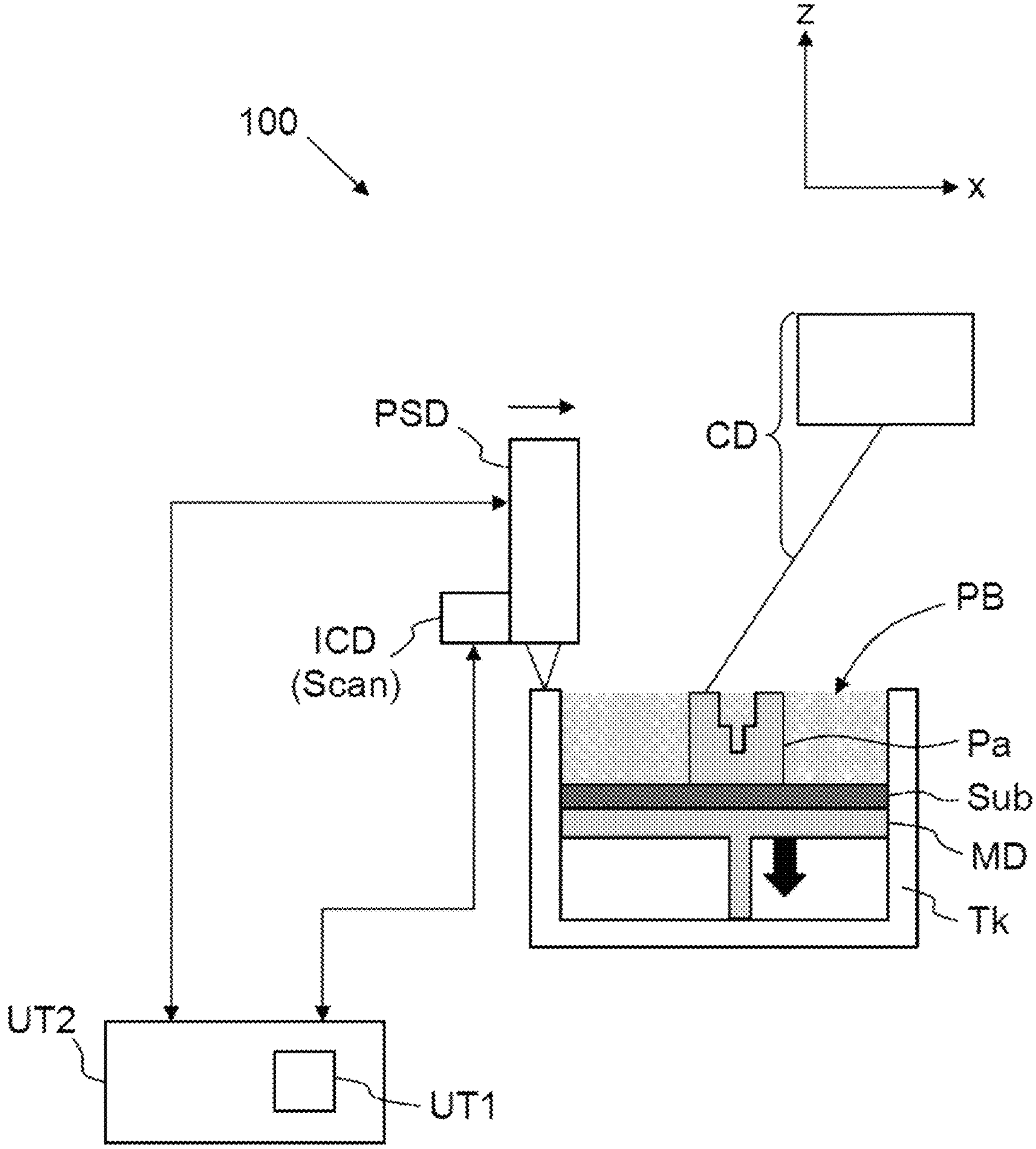
FIG. 7 depicts a system for metallic additive manufacturing by selective consolidation of a powder bed according to the invention.

In accordance with another aspect the invention concerns a system 100 for metallic additive manufacturing by selective consolidation of a powder bed depicted in FIG. 7.

The system 100 comprises a tank Tk intended to receive a substrate Sub on which a part Pa will be manufactured, a device PSD for spreading the powder and a device CD for consolidating the powder. It preferably also comprises a device MD for moving the substrate vertically. The system 100 also comprises a device 10 according to the invention, depicted in the second variant in FIG. 7, the device ICD comprising a flat-bed scanner Scan. The system 100 also comprises a second processing unit UT2 configured to control the execution of the metallic additive manufacturing. The first processing unit UT1 is preferably integrated into UT2.

In one embodiment the image capture device ICD of the system 100 comprises a flat-bed scanner Scan connected to the spreading device PSD. Image capture is then effected with a device fastened to that used for spreading the powders, which is advantageous in terms of the layout in the machine. Adding to an additive manufacturing machine a scanner for carrying out the surface inspection has moreover already been described, for example in the document U.S. Ser. No. 10/981,225.

Figure 8:
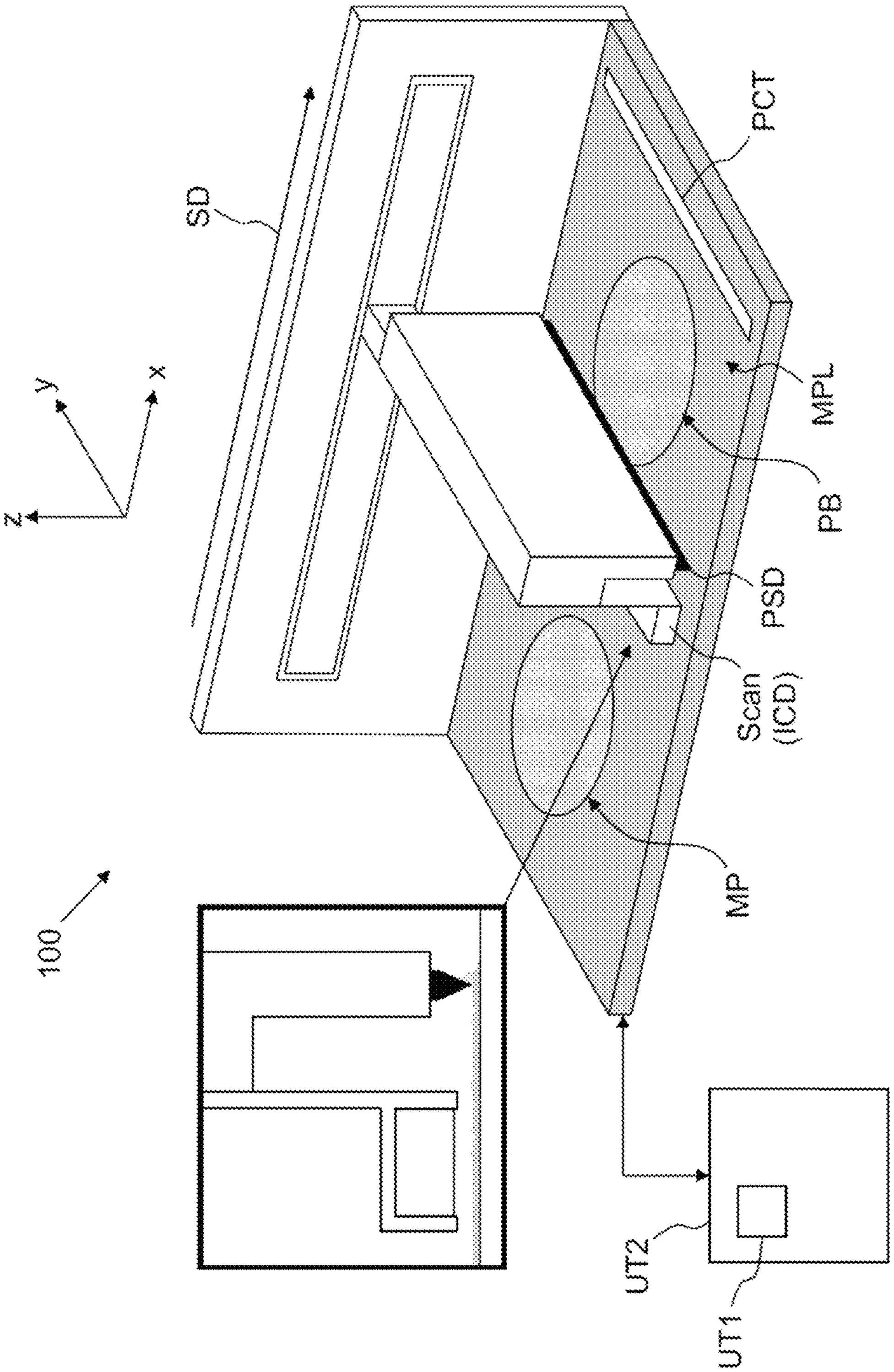
FIG. 8 depicts in more detail a system for metallic additive manufacturing by selective consolidation of a powder bed according to the invention.

A more detailed implementation of a system 100 with a scanner Scan is depicted in FIG. 8.

As a reminder, the theory of the scanner is as follows: a lamp, situated on a mobile block, scans all the surface of the document/the surface. The operation is effected step-by-step. It divides the document/surface into imaginary lines and it is the step of advancing the block that determines the horizontal resolution of the scanner. A sensor receives the light reflected by the document/surface and defines the colour of the points that constitute each line. Two technologies are used in flat-bed scanners, CCD and CIS (Contact Image Sensor).

In a CCD type scanner the lamp emits white light that is then reflected line by line via a set of mirrors. At the end of travel the beam passes through a lens that concentrates the light rays and causes them to converge toward the CCD sensor consisting of strips of photosensitive elements. To reproduce the colour of the documents/surfaces red, green and blue filters cover them alternately. The sensor measures line by line the quantity of light received and transforms this into an electrical charge, which is then converted into digital data.

In the CIS technology the light source consists of diodes (LED) emitting red, green and blue light and the sensors are disposed across the entire width of the scanner and are moved at the same time as the LEDs. A cylindrical lens causes the light of three colours emitted by the LEDs to converge toward the sensor. The LEDs, the lens and the sensor are part of the same device, one per pixel across its width.

The two technologies are compatible with the invention and commercially available scanners generally deliver colorimetric information per pixel coded from 1 to 255 on the three colours R, G and B, but the CIS technology is preferred because it offers better colorimetric performance.

A plurality of resolutions have been tested and found to work. Preferably, a high resolution, typically equal to 2400 dpi or even 4800 dpi, enabling the size of a particle to be resolved, is preferred for a more faithful measurement of the colour of the powder bed. The speed of the spreading device being relatively high (for example 50 mm/s), in one embodiment the image capture is effected via the scanner fixed to the spreading device when the latter returns to its initial position at a speed compatible with the high resolution (for example 0.16 mm/s) and not during the spreading of the powder proper.

The high resolution is preferred because it makes it possible to resolve the size of the particles, and the deterioration of a powder bed is not homogeneous but consists of coloured particles dispersed over the surface.

There is described next a method illustrated by an experimental example of determining the calibration function $FC_{Mat}$ for executing the method 20 according to the invention.

It is first necessary to have available a plurality of samples of the powder, each sample having a different and known oxygen concentration.

An SS316L stainless steel powder is considered and different oxidations of this powder are produced by subjecting samples to different combinations of time and temperature in an oven. The oxygen concentration is then measured ex situ by a melting in inert gas (Inert Gas Fusion) method known to the person skilled in the art. It is seen by eye that the colour of the powder varies between grey and then orange/brown for low concentrations, after which as the concentration increases the powder turns pink and then blue.

An image of each sample is then produced and the associated mean colour determined by a colorimetric code comprising the three quantities (G1, G2, G3). Colours with an associated oxygen concentration value are known as calibration data.

This measurement was carried out on the samples using a Canon CIS-type scanner with a resolution of 4800 dpi and the colour was measured for all of the pixels of the stored image. A mean value of R, G and B was then calculated from the measured values for the various pixels.

Figure 9:
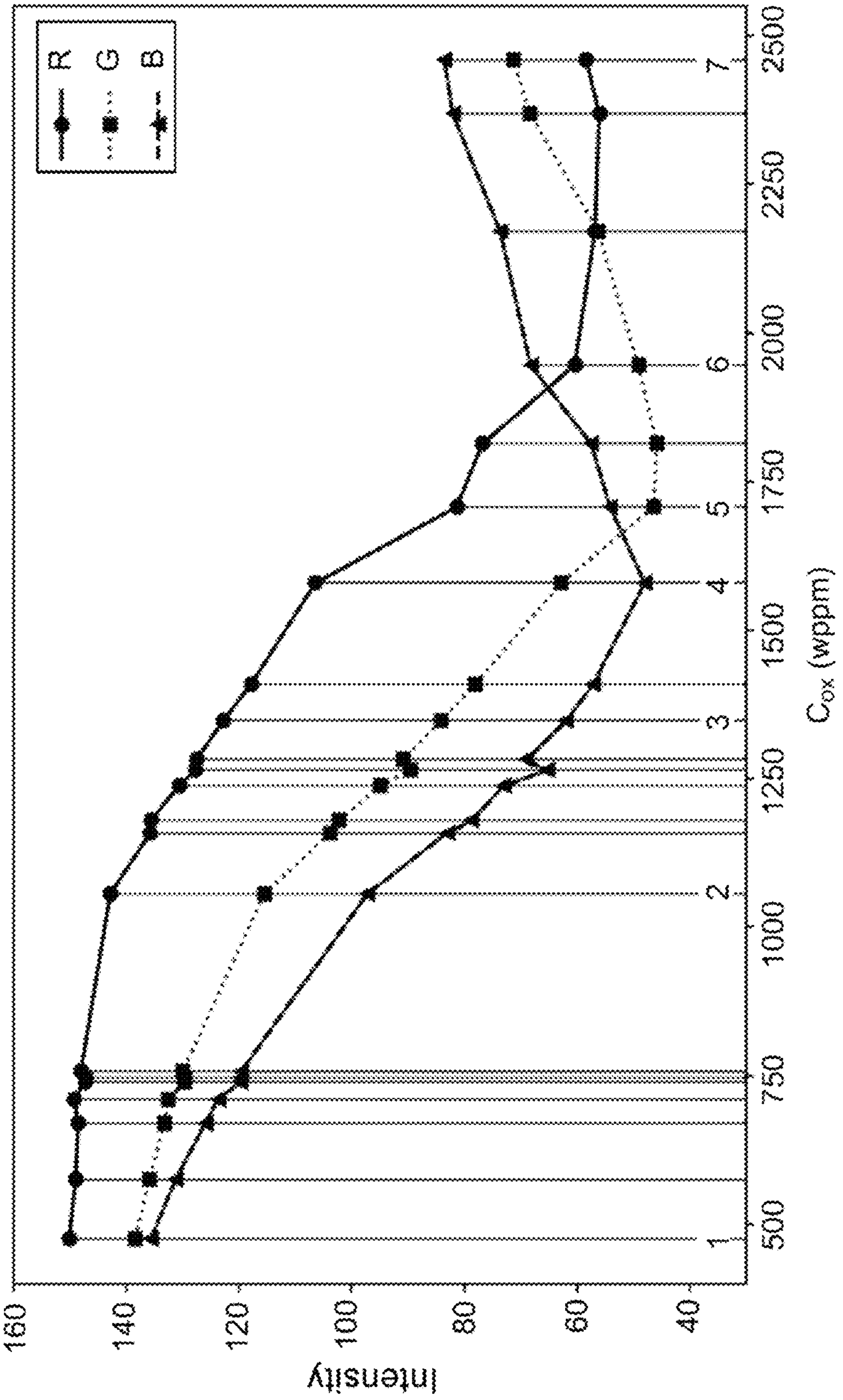
FIG. 9 depicts calibration data for the 22 samples produced and represents the intensity of the three components R, G and B associated with the various concentrations of the samples.

FIG. 9 depicts the calibration data for the 22 samples produced having oxygen concentrations in the range of interest [200, 2500] wppm, and represents the intensity of the three components R, G and B (each coded from 1 to 255) associated with the various concentrations of the samples.

Figure 10:
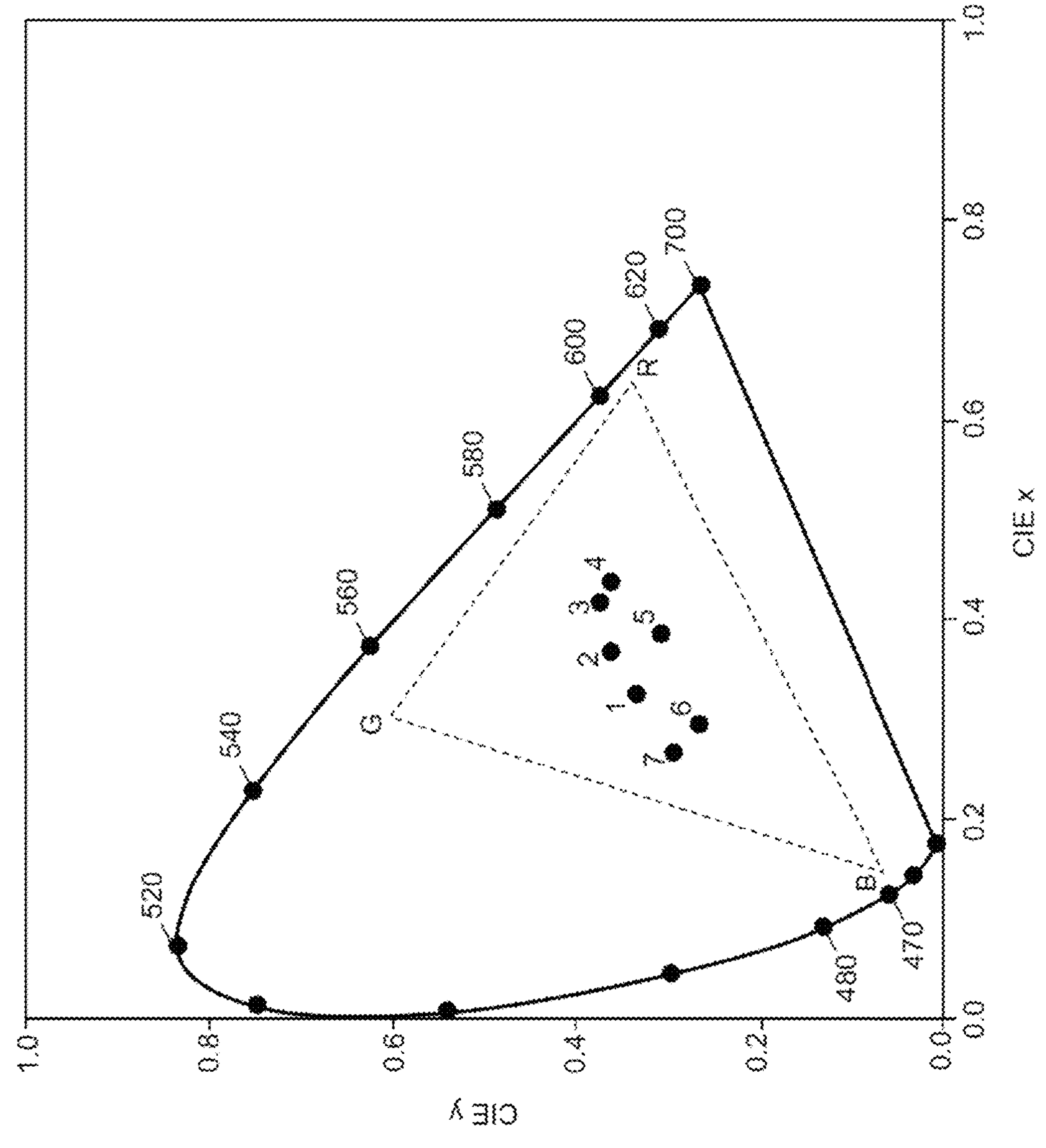
FIG. 10 depicts the colour associated with 7 samples represented in the colorimetric space CIExy 1931.

By way of illustration, the colour associated with 7 samples numbered from 1 to 7 chosen from the 22 (see table I below) was calculated and is represented in FIG. 10 in the colorimetric space CIExy 1931 commonly used to represent the colours.

TABLE I

| Characterised samples | | | | | | | |
|---|---|---|---|---|---|---|---|
| Sample | 1 | 2 | 3 | 4 | 5 | 6 | 7 |
| Measured Cox (wppm) | 475 | 1055 | 1347 | 1579 | 1707 | 1946 | 2458 |

From the respective positions of the 7 colours associated with the 7 samples of 316L stainless steel powder having increasing oxygen concentrations it is seen that over the Cox range of interest the colours are indeed different and vary from grey to orange and then to blue via pink.

Finally, a calibration function is determined by regression on the basis of the calibration data. First-degree or second-degree polynomial regression is preferably used and has yielded good results.

The variables R, G and B are respectively denoted x, y and z in the following equations.

In a first example applied to the data from FIG. 9 the calibration function $CF1_{Mat}$ was determined by regression considering a polynomial of type (1, x, y, z, xy, xz, yz, $x^2$, $y^2$, $z^2$) and yielded:

$$CF1_{Mat}=4036-49x+0.24x^2+45y-0.60xy+0.05y^2-18z+0.3xz+0.36yz-0.40z^2$$

Using this first regression a correlation determination coefficient $R^2=0.99824$ was calculated.

In a second example applied to the data from FIG. 9 the calibration function $CF2_{Mat}$ was determined by regression considering a polynomial of type (1, x, y, z, xy, xz, yz) and yielded:

$$CF2_{Mat}=6117-95x+178y-0.77xy-127z+1.6xz-0.77yz$$

Using this second regression a coefficient $R^2=0.99642$ was calculated.

In a third example applied to the data from FIG. 9 the calibration function $CF3_{Mat}$ was determined by regression considering a polynomial of type (1, x, y, z, $x^2$, $y^2$, $z^2$) and yielded:

$$CF3_{Mat}=2906+13x-0.30x^2-2.5y+0.40y^2-6.22z-0.22z^2$$

With this third regression a coefficient $R^2=0.99676$ was calculated.

Given that the values of $R^2$ are very close to 1, it is found that the three regressions give good results.

The method 20 according to the invention was tested using the above calibration function $CF1_{Mat}$. For this there were available samples of new 316L stainless steel powder (R0) and of powders that had been used in a MAM-PBF system (by laser melting) and recycled several times: 1 time (R1), 5 times (R5), 10 times (R10) and 15 times (R15). This recycling was the subject of a study in the aforementioned publication by Delacroix et al. and corresponds to the manufacture by laser melting on a powder bed of a number of parts on a tray, recovery of all the powder not consolidated in the part, screening of that powder in order to remove the coarsest particles, and reintroduction of this screened powder into the machine for a new manufacturing cycle without adding new powder.

The powder bed is scanned during passage in the machine. Digital zooms of the scans highlight a heterogeneous structure of the particles with particle-to-particle changes and show the multitude of oxide-covered particles of different colours in the R15 scan.

It is preferable to use the same image capture device to determine the calibration function and for subsequent characterisation of the powder.

Figure 11:
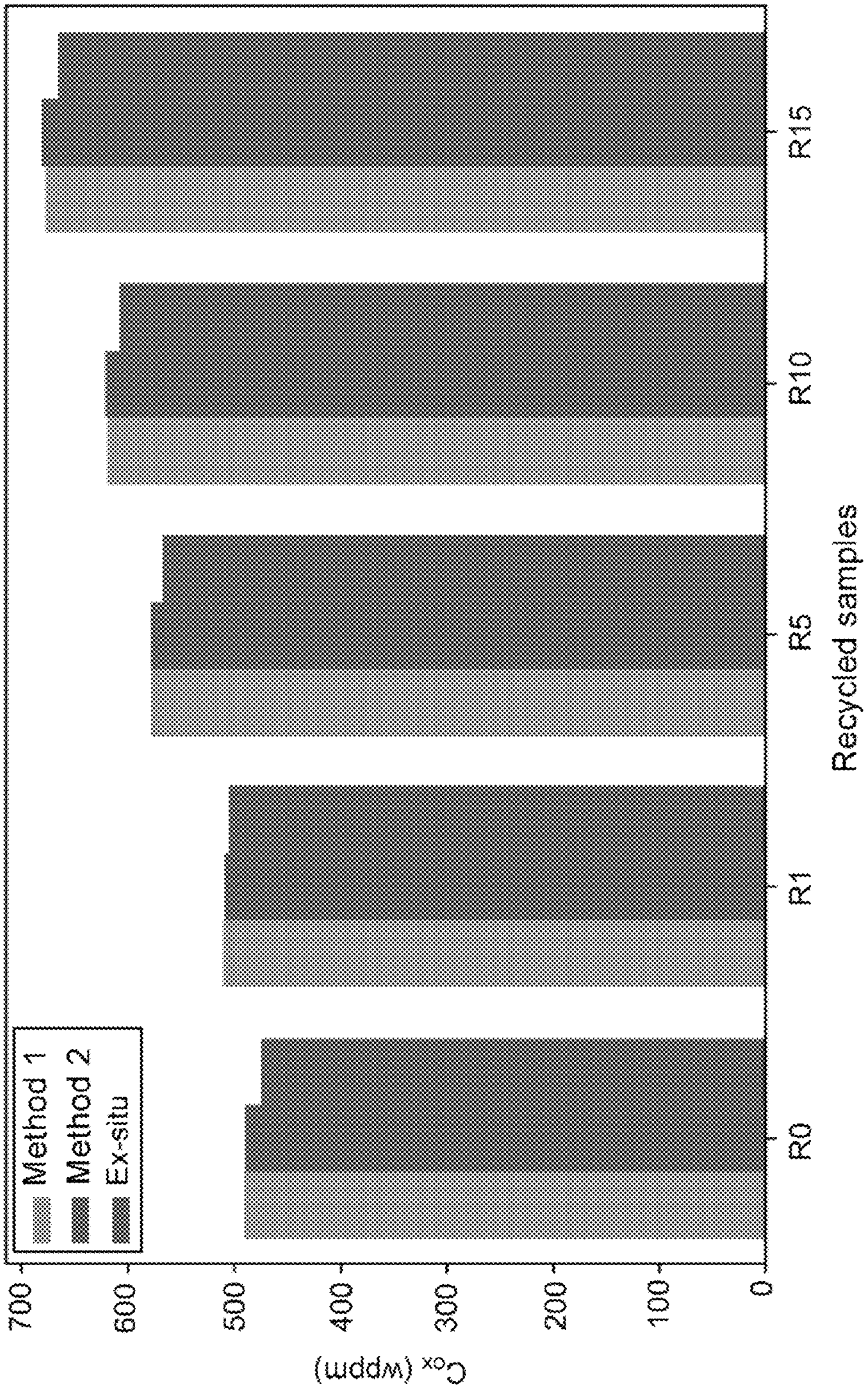
FIG. 11 depicts the various oxygen concentration measurements produced using method 1 and method 2 according to the invention, and using an ex situ method employing melting in inert gas.

From the images produced by the scan for each powder bed R0 to R15 the oxygen concentration was determined using method 1 and method 2 and compared to measurements effected ex situ by melting in inert gas. FIG. 11 shows the various values of Cox obtained.

It is found that the values of Cox obtained with the method according to the invention successfully follow the tendency for the oxygen concentration to increase if the powder is increasingly reused.

A remarkable result is that the results obtained by the method according to the invention (methods 1 and 2) are perfectly aligned with the ex situ measurements. The results using methods 1 and 2 according to the invention are slightly higher than the ex situ results, up to 10-15 wppm, but remain practically always within the standard deviation of the chemical analysis values.

Another positive result is that the second method yields results extremely close to those obtained using the first method (less than 5 wppm difference). Consequently, the second method alone may be applied for the analysis of the powder bed scans because this approach yields almost instantaneous oxygen concentration results (execution of the coding in 70 ms for a 100 $mm^2$ zone/7 s for a 10 $cm^2$ zone). The first method is nevertheless feasible and more rigorous.

As explained above, it was not evident a priori that the determination of the oxygen by colorimetry to monitor the quality of the powders in additive manufacturing would be predictable and comparable to conventional measurements. Moreover, the theoretical approach consisting in stating that the colour is determined uniquely by the thickness of the film around the particle is certainly not totally accurate, and the fact that the method according to the invention gives an exact oxygen concentration result with a highly recycled powder (R10 and R15) is in itself remarkable and surprising.

Moreover, the oxidation in the method takes place in an inert gas (generally argon, nitrogen or helium) atmosphere with very low oxygen partial pressures and temperatures to which the powders are subjected that are not known and not uniform. It was therefore no more evident that the correlation between oxygen and colour produced via controlled oxidation in an oven in air at fixed temperatures (for the determination of the calibration function) enables similar values to be found with coloured particles because of oxidation during the laser melting process on the powder bed.

To test even further the robustness of the method according to the invention samples of powder degraded "artificially" were also analysed. Mixtures were made of fresh powder containing different fractions of powders oxidised in the oven (5 and 10 wt %) with different oxygen levels L1 of 1580 wppm and L2 of 2350 wppm. There were therefore 4 samples:

Sample [L1-5%]: 95% new powder–5% powder oxidised to level L1

Sample [L1-10%]: 90% new powder–10% powder oxidised to level L1

Sample [L2-5%]: 95% new powder–5% powder oxidised to level L2

Sample [L2-10%]: 90% new powder–10% powder oxidised to level L2

Figure 12:
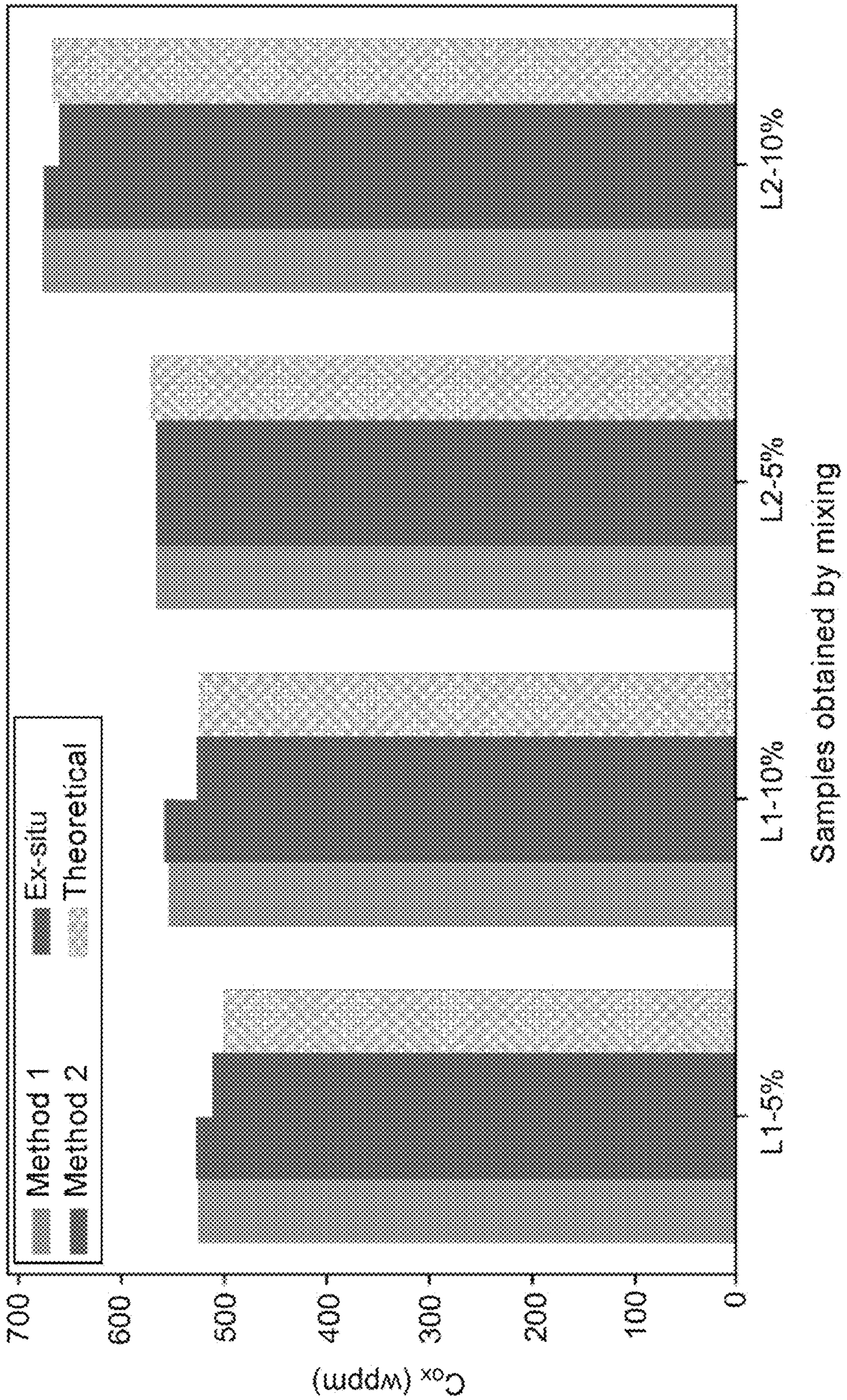
FIG. 12 depicts the oxygen concentration results obtained with methods 1 and 2 of the method according to the invention, the ex situ method by melting in inert gas, and theoretical values for the four samples.

FIG. 12 shows the results for concentrations Cox obtained with methods 1 and 2 of the method according to the invention, the ex situ method by melting in inert gas and theoretical values for the four samples. These theoretical values represent the expected oxygen concentration of the powder mixtures on the basis of the fractions by weight and the oxygen concentrations of the two constituents.

The measurements by melting in inert gas of the four samples are in almost perfect agreement with the values calculated theoretically.

Where the results obtained using methods 1 and 2 according to the invention are concerned, both methods slightly overestimate the values relative to those from chemical analysis. The trends are still respected and the results of the two methods are once again virtually identical. For a given fraction of oxidised particles in the coatings the Cox overestimate is more pronounced for the L1 samples. The latter consist of light orange particles, whereas the L2 samples contain blue particles. It is seen that the edges of the coloured particles appear darker in the acquired images, potentially leading to overestimation. The L2 oxidised particles being relatively dark already, the edge effect is less pronounced, with less colour variation, which could explain the smaller differences measured for the L2 mixtures. Moreover, for a given level, the difference is greater for the samples with 10% coloured particles. The increase in the number of coloured particles induces an edge effect that is more present and that is therefore reflected in greater divergence. It is nevertheless remarkable and also very surprising that the method according to the invention enables a Cox estimate so close to reality for a powder comprising a mixture of particles with different oxidation.

The invention claimed is:

1. A method for determining an oxygen concentration (Cox) of a powder (MP) of a metallic material (Mat) taking the form of a powder bed (PB), said method comprising steps consisting in:

A producing an image (Im) of at least a part of said powder bed, said image comprising a set of pixels (P), a pixel having a colour coded in accordance with a colorimetric code comprising three quantities (G1, G2, G3), B determining the oxygen concentration of the powder from values of said three quantities associated with pixels of the image using a predefined calibration function ($CF_{Mat}$) that is a function of said material, and linking said oxygen concentration and said three quantities.

2. The method according to claim 1, wherein the colorimetric code is the RGB system, the three quantities being known as R, G and B.

3. The method according to claim 1, wherein the calibration function is a first-degree or second-degree polynomial with three variables corresponding to the three quantities and the coefficients of which are a function of said material.

4. The method according to claim 1, wherein step A is carried out all at once using a video camera.

5. The method according to claim 1, wherein step A is carried out by scanning using a flat-bed scanner.

6. The method according to claim 1, wherein step B comprises substeps consisting in:

B1 Determining for a plurality of pixels of the image an oxygen concentration (Coxj), known as the pixel concentration, via the calibration function, B2 Determining the oxygen concentration from a mean value of said pixel concentrations.

7. The method according to claim 1, wherein step B comprises substeps consisting in:

B'1 Determining a mean value (G1m, G2m, G3m) of each quantity from values (G1j, G2j, G3j) of said quantities associated with a plurality of pixels of the image, B'2 Determining the oxygen concentration from said mean values of the three quantities via the calibration function.

8. The method according to claim 1 for metallic additive manufacturing by selective consolidation of a powder bed including a step of determining the oxygen concentration of said powder bed carried out at least once in said metallic additive manufacturing method.

9. A metallic additive manufacturing method by selective consolidation of a powder bed, comprising a step of determining an oxygen concentration of said powder bed according to the method of claim 1, wherein the step of determining the oxygen concentration of the powder bed is applied at a commencement of the metallic additive manufacturing method, during injection of inert gas into a manufacturing chamber and/or at an end of the metallic additive manufacturing method, during cooling of a manufactured part.

10. The metallic additive manufacturing method according to claim 8, comprising a step of adapting parameters of the method as a function of the value of the oxygen concentration that has been determined.

11. The metallic additive manufacturing method according to claim 8, further comprising a step of mixing the powder used with new powder when the oxygen concentration is greater than a predetermined threshold, said mixing step being carried out between manufacturing two parts.

12. A device for determining an oxygen concentration (Cox) of a powder (MP) of a metallic material (Mat) taking the form of a powder bed (PB), comprising:

an image capture device (ICD) configured to produce an image (Im) of at least a part of said powder bed, said image comprising a set of pixels (P), a pixel having a colour coded in accordance with a colorimetric code comprising three quantities (G1, G2, G3), a first processing unit (UT1) configured to determine the oxygen concentration of the powder from values of said three quantities associated with pixels of the image using a predefined calibration function ($CF_{Mat}$), a function of said material, and linking said oxygen concentration and said three quantities.

13. A non-transitory storage medium on which is stored a computer program including instructions that cause a device to execute the steps of the method according to claim 1, wherein the device determines the oxygen concentration (Cox) of the powder (MP) of the metallic material (Mat) taking the form of the powder bed (PB), the device further comprising:

an image capture device (ICD) configured to produce the image (Im) of at least a part of said powder bed, said image comprising the set of pixels (P), the pixel having the colour coded in accordance with the colorimetric code comprising three quantities (G1, G2, G3), a first processing unit (UT1) configured to determine the oxygen concentration of the powder from values of said three quantities associated with pixels of the image using the predefined calibration function ($CF_{Mat}$), the function of said material, and linking said oxygen concentration and said three quantities.

14. A system for metallic additive manufacturing by selective consolidation of a powder bed, comprising:

a device according to claim 12 for determining the oxygen concentration, a tank (Tk) intended to receive a substrate on which a part will be manufactured, a device (PSD) for spreading said powder on the surface of the powder bed, a device (CD) for consolidating the powder, a second processing unit (UT2) configured to control the execution of the metallic additive manufacturing.

15. The metallic additive manufacturing system according to claim 14, wherein the image capture device comprises a flat-bed scanner (Scan) connected to the spreading device (PSD).

16. The metallic additive manufacturing system according to claim 14, wherein the image capture device comprises a high-resolution video camera.

17. A method of determining a calibration function for the execution of the method according to claim 1, comprising steps consisting in:

obtaining a plurality of samples of said powder, each sample having a different and known oxygen concentration, producing an image of each sample and determining an associated mean colour, a colour being coded in accordance with a colorimetric code comprising three quantities (G1, G2, G3), colours with an associated oxygen concentration value being known as calibration data, determining said calibration function from said calibration data by regression.

* * * * *